United States Patent
Hoch

(10) Patent No.: US 9,523,598 B2
(45) Date of Patent: Dec. 20, 2016

(54) FILL LEVEL MEASURING DEVICE

(71) Applicant: IFM ELECTRONIC GMBH, Essen (DE)

(72) Inventor: Werner Hoch, Tettnang (DE)

(73) Assignee: IFM ELECTRONIC GMBH (DE)

( * ) Notice: Subject to any disclaimer, the term of this patent is extended or adjusted under 35 U.S.C. 154(b) by 220 days.

(21) Appl. No.: 14/369,726

(22) PCT Filed: Jan. 25, 2013

(86) PCT No.: PCT/EP2013/051446
§ 371 (c)(1),
(2) Date: Jun. 30, 2014

(87) PCT Pub. No.: WO2013/110764
PCT Pub. Date: Aug. 1, 2013

(65) Prior Publication Data
US 2014/0352402 A1 Dec. 4, 2014

(30) Foreign Application Priority Data

Jan. 27, 2012 (DE) .................. 10 2012 201 226

(51) Int. Cl.
*G01F 23/00* (2006.01)
*G01F 23/26* (2006.01)
(Continued)

(52) U.S. Cl.
CPC ......... *G01F 23/0084* (2013.01); *G01F 23/265* (2013.01); *G01F 23/266* (2013.01); *G01F 25/00* (2013.01)

(58) Field of Classification Search
CPC .............. G01F 23/0084; G01F 23/0069; G01F 25/0061; G01F 23/266
(Continued)

(56) References Cited

U.S. PATENT DOCUMENTS 4,259,865 A 4/1981 Myers
4,467,646 A 8/1984 Berryman et al.
(Continued)

FOREIGN PATENT DOCUMENTS

DE          25 21 687 A1    11/1976
DE   10 2008 027921 B4    11/2011

OTHER PUBLICATIONS

International Search Report; PCT/EP2013/051446; International Filing Date: Jan. 25, 2013; IFM Electronic GMBH; 2 pgs.

*Primary Examiner* — Peter Macchiarolo
*Assistant Examiner* — Anthony W Megna Fuentes
(74) *Attorney, Agent, or Firm* — Schmeiser, Olsen & Watts, LLP

(57) ABSTRACT

Fill level measuring device having a control unit, which contains a high-frequency generator for generating a transmission signal, an amplifier, an amplifier and an evaluation unit, and a spatially remote probe, which contains a measuring impedance, a reference impedance, a first rectifier and a second rectifier, as well as a connecting line between the control unit and the probe, wherein the rectifier detects the voltage of the transmission signal in the probe, and this voltage is transmitted to the control unit as a first DC voltage signal, and the rectifier converts the probe current in the probe into a second DC voltage signal via measuring resistors, and both signals are supplied to the control unit for the purpose of determining the fill level, wherein the rectifiers are thermally coupled to one another.

3 Claims, 1 Drawing Sheet

(51) Int. Cl.
*G01F 25/00* (2006.01)
*G01F 23/24* (2006.01)

(58) Field of Classification Search
USPC .............. 73/1.31, 1.73, 290 R, 304 C, 304 R
See application file for complete search history.

(56) References Cited

U.S. PATENT DOCUMENTS

| | | | | |
|---|---|---|---|---|
| 5,566,572 | A | * | 10/1996 | Pankow ................ G01F 23/266 324/611 |
| 5,611,239 | A | * | 3/1997 | Klinshteyn ......... G01F 23/2845 324/637 |
| 6,107,924 | A | | 8/2000 | Kasai et al. |
| 2010/0313653 | A1 | * | 12/2010 | Palata ................... G01F 23/263 73/304 C |

* cited by examiner

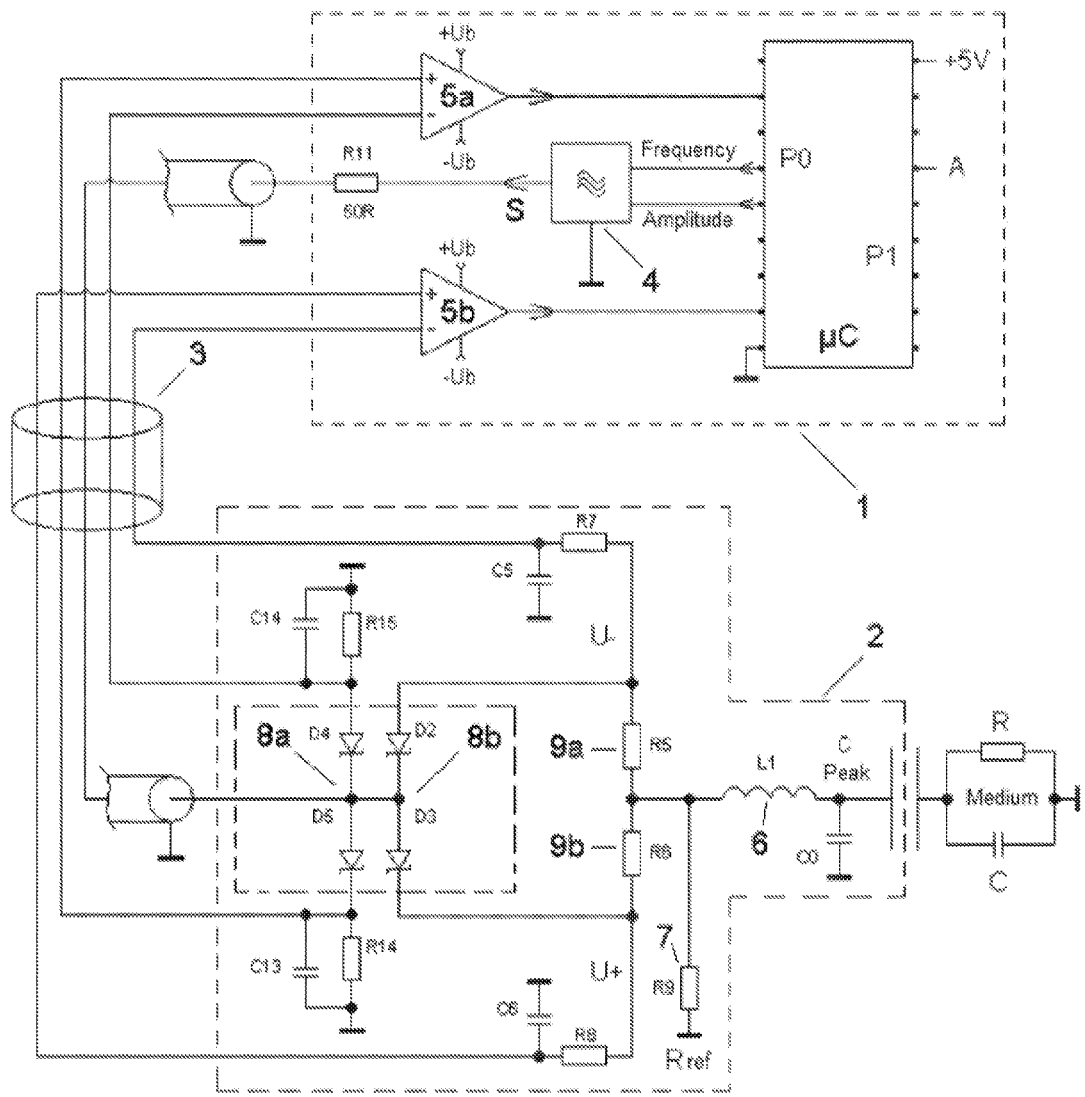

FILL LEVEL MEASURING DEVICE

CROSS-REFERENCE TO RELATED APPLICATIONS

This application claims priority to PCT Application No. PCT/EP2013/051446, having a filing date of Jan. 25, 2013, based off of DE Application No. 102012201226.5 having a filing date of Jan. 27, 2012, the entire contents of which are hereby incorporated by reference.

FIELD OF TECHNOLOGY

The following relates to a fill level measuring device to determine the fill level of a medium in a container.

BACKGROUND

Capacitive fill level sensors have been used for a long time both as limit switches as well as for media determination. Their basic advantages are that they feature no mechanical moving parts and can measure "through" a housing wall consisting of an electrically insulating material, i.e. sealing problems are avoidable.

Electronic fill level sensors for water-based media have been produced and marketed by the applicant under the designation LMT100, and those for oils and fats under the designation LMT110.

DE102008027921B4 shows an admittance measurement circuit for a capacitive fill level sensor in which a frequency spectrum generated by a tunable signal source is applied to a probe constructed as a resonator and a reference impedance that cannot be influenced by the medium. Its response provides information about the fill level and possible adhesions, but also about the type of medium. Because of the control unit consisting of semiconductor components their permanent operating temperature is limited to 85° C., which in many cases is not sufficient. The problem appears to be solvable by the spatial separation of the probe and the control unit. Since these devices, however, operate at very high frequencies, in a range definitely above 100 MHz, their resonance behavior noticeably worsens, and also their measurement accuracy despite the screened connecting lines.

U.S. Pat. No. 4,259,865A shows such a capacitive fill level measuring device with spatially separated and thus thermally decoupled measuring and reference capacitances. The impedances of both sensors are measured. One of the two sensors is used as a reference for the adjustment of the transmission voltage. An operating frequency is not specified. Because of the voltage drop on the comparatively long lines and their susceptibility to interference, the circuit is inexact and not suited for high frequencies in the range above 10 MHz. The temperature drifts can be compensated by a control voltage VR. Its manufacture is, however, expensive and fault-prone.

U.S. Pat. No. 6,107,924A shows a measuring device for impedance measurement in the frequency range between 10 MHz and 300 MHz. The sensor consists of a transformer-induced resonant circuit adapted to a coaxial cable. The standing wave ratio influenced by the measurement resistor is measured in the coaxial line with a directional coupler.

Here, the quality of the coaxial line, in particular also of the standing waves generated by contact points or plug-in connectors has an influence on the measurement result. The generation of a reference signal is difficult. The measurement principle requires a minimum length of the coaxial line dependent on the frequency. The directional coupler can indeed be in the vicinity of the oscillator but not in the vicinity of the sensor. That initially appears to be an advantage but can require the additional temperature measurement recommended in the literature.

SUMMARY

An aspect relates to a temperature-compensated fill level measuring device suitable for high operating frequencies. In particular, the operating temperature of the above-mentioned fill level sensors should be expanded maintaining the measurement accuracy.

One embodiments of the invention is to not only determine the current or the voltage at the probe but also its impedance. To that end, the voltage and the current are measured directly at the probe and not at a spatially separated control unit as shown in the prior art.

For that purpose, the high frequencies signals are rectified, filtered, and transmitted as very low frequency signals or direct voltage to a control unit on low-ohm, self-contained lines.

The acquisition of high frequency signals in the probe is advantageous in two ways. Standing waves in the high frequency line virtually do not affect the measurement because of the regulated transmission voltage. Thus, the transmission signal can assume almost any shape, it can, for example, be rectangular.

Parasitic capacities of the measurement lines likewise do not interfere with the measurement, because they can hardly influence the transmitted direct voltage signals.

Another aspect of the arrangement is that diodes remain in the probe as the only semiconductor components and determine the range of the operating temperature. The maximum allowable junction temperature of the diodes is 150° C. They are advantageously housed in a common housing and thus are thermally coupled with each other in an optimal manner. Thus, the measured current and temperature values have the same temperature drift.

The invention will be described in more detail with reference to the drawing.

BRIEF DESCRIPTION

Some of the embodiments will be described in detail, with reference to the following figure, wherein like designations denote like members, wherein:

FIG. 1 depicts an embodiment of a fill level measuring device.

DETAILED DESCRIPTION

FIG. 1 shows an inventive fill level measuring device. The control unit 1 contains a micro-controller µC as an evaluation unit, as well as a high frequency generator 4, here a tunable sinus oscillator, as well as a first measurement amplifier 5a and a second measurement amplifier 5b. The control unit 1 is connected to a probe 2 via a partially screened connection line 3. The probe 2 has a measuring impedance 6. This contains an inductance L1 of several 100 nH. The parasitic capacitance of the housing is designated with C0 and is of several pF. It can be increased for tuning purposes. The capacitance of the medium is of the same order of magnitude. The resistance $R_{medium}$ and the capacitance $C_{medium}$ represent the impedance of the medium to be measured. The reference impedance 7 consists of an ohmic resistance thermally coupled with the probe 2 but preferentially not influenced by the medium.

The probe 2 also contains a first peak value rectifier 8a to acquire the transmission voltage. In addition to the diodes D4 and D5, it comprises the smoothing condensers C13 and C14 with its load resistances R14 and R15. Here a direct voltage corresponding to the transmission amplitude is generated which is sent to the control unit 1.

The second peak value rectifier 8b decomposes the transmission signal into its two half-waves. The half-waves are again joined behind the measurement resistors 9a and 9b of about 10 ohms and sent to the resonator 6 already described above, as well as to the reference impedance 7 switched in parallel. The reference impedance 7 consists of an ohmic resistance and is therefore independent of the frequency. The voltage decreasing via the resistors 9a and 9b represents the probe current. This voltage is smoothed by the low-pass filters R7/C5 and R8/C6 and is likewise sent to the control unit 1 via the connection line 3.

Description of the Mode of Operation

The high frequency generator 4 generates a transmission signal S in the frequency range of 50 MHz to 200 MHz. It is connected to the microcontroller µC which controls its frequency and amplitude. For that purpose, the microcontroller µC has several digital/analog converters. The transmission signal is sent to the probe 2 via the connection line 3. Here the transmission voltage is measured in the manner described above.

The transmission current divided into its half-waves is again joined after the current measurement, as also described above, and sent as a complete high frequency signal to the measuring impedance 6 and the reference impedance 7 switched in parallel.

Since the transmission voltage is likewise known, the following ohmic law applies:
Rmess=Umess/Imess.

The connection line 3 can sectionally or also completely consist of circuit paths on a single or multi-layer printed circuit board. As already outlined above, the impedance of these lines is to a large extent uncritical.

The operation amplifiers 5a and 5b depicted without external circuitry are used as low-pass filters and for signal adaptation.

The microcontroller µC has digital/analog converters and reads the current and voltage values belonging to each signal frequency into a memory. Thus, a specific frequency range can be scanned point-by-point around the expected resonance point of the measuring impedance 6. Separate analog/digital converters and external memories can, obviously, also be used.

In addition to the measuring impedance 6 the position of the resonance frequency as well as the amplitude in the case of the resonance are evaluated. The reference impedance 7 determines the behavior of the probe 2 outside the resonance frequency. It is used for calibration and temperature compensation.

The high frequency generator 4 is advantageously a voltage-controlled oscillator (VCO) whose amplitude can be controlled by means of the voltage measured in the probe 2 by the rectifier 8a. Thus the transmission signal in the probe 2 can be kept constant at various measurement frequencies. All measuring frequencies (measuring points) are regulated with the appropriate software in the micro-controller µC comprising the following steps:

Acquire and digitalize current and voltage signals
    Compare amplitude with the target value
    Calculate amplitude control signal from a characteristic curve archived in the µC
    Release amplitude control signal
    Acquire and digitalize current and voltage signals Embodiments of the invention relate to a fill level measuring device to determine the fill level of a medium in a container having a control unit 1 which contains a high frequency generator 4 for the generation of a transmission signal S, a first amplifier 5a, a second amplifier 5b, and an evaluation unit µC, and a spatially separated probe 2 onto which the transmission signal S is applied, and which contains a measuring impedance 6, a reference impedance 7, a first rectifier 8a and a second rectifier 8b, as well as a multicore connection line 3 for transmitting the signal between the control unit 1 and the probe 2, wherein the first rectifier 8a acquires the voltage of the transmission signal S in the probe 3 and transmits it as the first direct voltage signal to the control unit 1; the second rectifier 8b converts the probe current in the probe 3 into a second direct voltage signal via measurement resistors 9a, 9b, and both direct voltage signals are sent via the multicore connection line 3 of the control unit 1 for the determination of the fill level, wherein the rectifiers 8a, 8b are thermally coupled with each other.

In an exemplary embodiment, the probe current for measurement is split into its two half-waves which are again joined to a complete high frequency signal after passing through the measurement resistor 9a and 9b and finally sent to the medium to be measured.

The fill level sensor advantageously operates with a tunable high frequency generator 4 in a frequency range between 50 and 200 MHz without the adjacent frequency ranges being blocked as a result. Several high frequency generators 4 can obviously be provided.

The measuring impedance 6 and the measuring impedance 7 are switched in parallel. They can, however, be switched on or off by high frequency compliant analog commutators in order to perform separate measurements or generate several resonance points for different media.

REFERENCE NUMERALS

1 Control Unit
2 Probe
3 Multicore Connection Line
4 High Frequency Generator
5a First Amplifier
5b Second Amplifier
6 Measuring Impedance
7 Reference Impedance
8a First Rectifier
8b Second Rectifier
9a First Measurement Resistor
9b Second Measurement Resistor
µC Evaluation Unit, Microcontroller
S High Frequency Transmission Signal

The invention claimed is:

1. A fill level measurement device to determine a fill level of a medium in a container comprising: a control unit, a spatially separated probe and a multicore connection line configured to connect the control unit with the spatially separated probe, wherein the control unit contains a high frequency generator configured to generate a transmission signal, an evaluation unit configured to evaluate by means of a first amplifier and a second amplifier amplified probe signals, wherein the spatially separated probe contains a measuring impedance, not from the medium influencable reference impedance for calibration and temperature compensation, a first rectifier and a second rectifier, wherein the multicore connection line is configured to apply to the spatially separated probe the transmission signal and further configured to transmit the probe signals to the control unit, wherein the first amplifier and the second amplifier are connected on the output side to the evaluation unit and are configured to amplify direct voltages transmitted via the multicore connection line to the control unit, wherein the first rectifier is configured to acquire a voltage of the transmission signal in the spatially separated probe; the first rectifier, in combination with capacitors and resistors, is configured to transmit a first direct voltage signal via the multicore connection line to the control unit, wherein the second rectifier breaks the probe current down into its two half-waves so that a first of the two half-waves is present across a first measurement resistor and a second of the two half-waves is present across a second measurement resistor, wherein a second direct voltage, transmitted by the second rectifier in combination with capacitors and resistors, is supplied via the multicore connection line to the control unit, wherein the first rectifier and the second rectifier are thermally coupled with each other.

2. The fill level measurement device of claim 1, wherein the high frequency generator operates in a frequency range between 50 MHz and 200 MHz.

3. The fill level measurement device of claim 1, wherein the two measurement resistors share a common connection.

* * * * *